(12) United States Patent  
Choi

(10) Patent No.: US 7,593,153 B2  
(45) Date of Patent: Sep. 22, 2009

(54) ELECTROWETTING OPTICAL DEVICE AND METHOD OF CONTROLLING VOLTAGE OF THE SAME

(75) Inventor: Jae-young Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 166 days.

(21) Appl. No.: 11/689,661

(22) Filed: Mar. 22, 2007

(65) Prior Publication Data

US 2008/0062499 A1 Mar. 13, 2008

(30) Foreign Application Priority Data

Sep. 11, 2006 (KR) .................... 10-2006-0087516

(51) Int. Cl.
G02B 26/02 (2006.01)
(52) U.S. Cl. ...................... 359/228; 359/230
(58) Field of Classification Search ........... 359/228
See application file for complete search history.

(56) References Cited

U.S. PATENT DOCUMENTS

2005/0151709 A1* 7/2005 Jacobson et al. ............. 345/84
2006/0054503 A1* 3/2006 Pamula et al. ............... 204/450
2007/0149939 A1* 6/2007 Tanaka ....................... 604/378

* cited by examiner

*Primary Examiner*—Jordan M. Schwartz
*Assistant Examiner*—James C Jones
(74) *Attorney, Agent, or Firm*—Cantor Colburn LLP

(57) ABSTRACT

An electrowetting optical device includes a cell surrounded by a light-incident surface, a light-exit surface, and a plurality of side surfaces, an electrode portion formed along the light-incident surface, the electrode portion including a plurality of electrodes, an insulation layer covering at least a portion of the electrode portion, an oil layer within the cell, the oil layer contacting the electrode portion, an aqueous solution layer filled in the cell, the aqueous solution layer contacting the oil layer, and a light source emitting light onto the light-incident surface. A method of controlling a voltage of the electrowetting optical device is also provided.

18 Claims, 15 Drawing Sheets

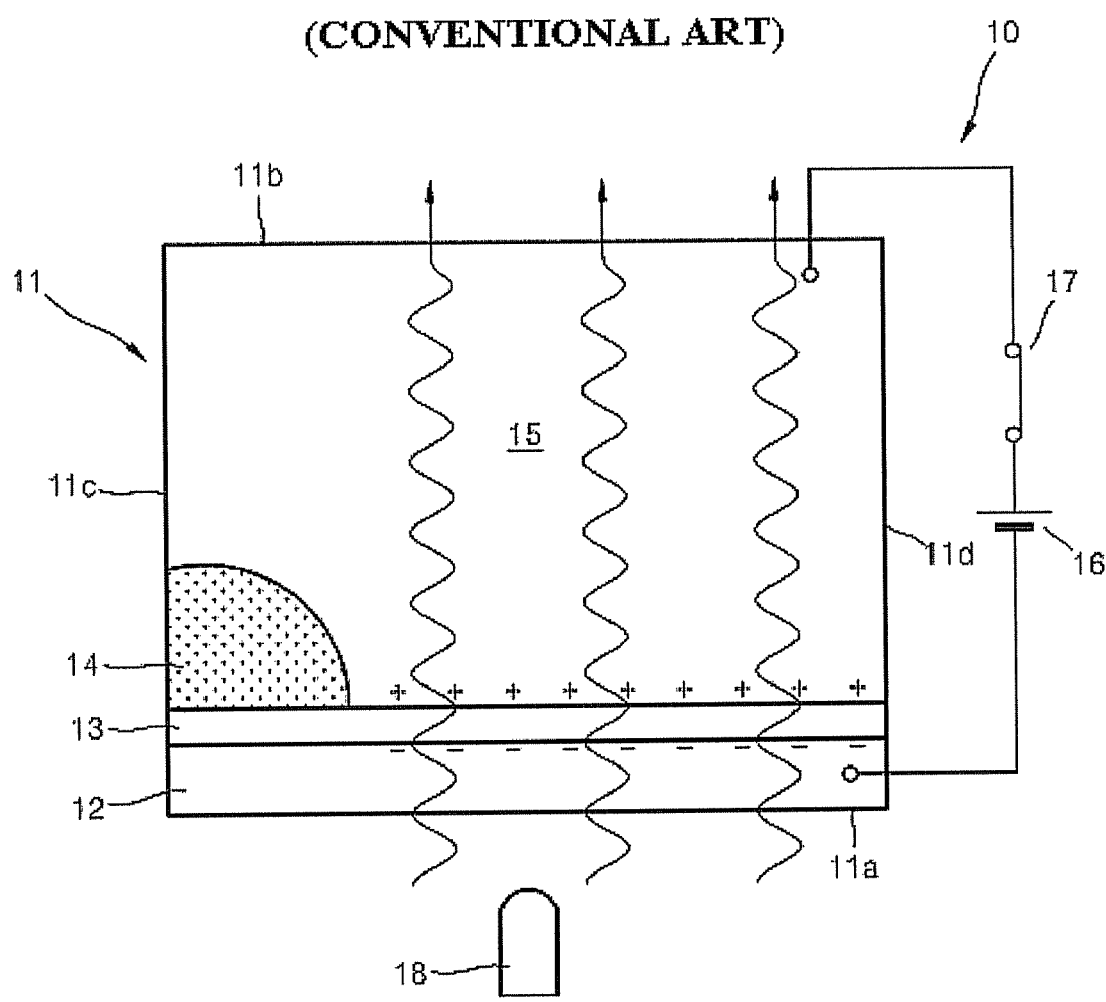

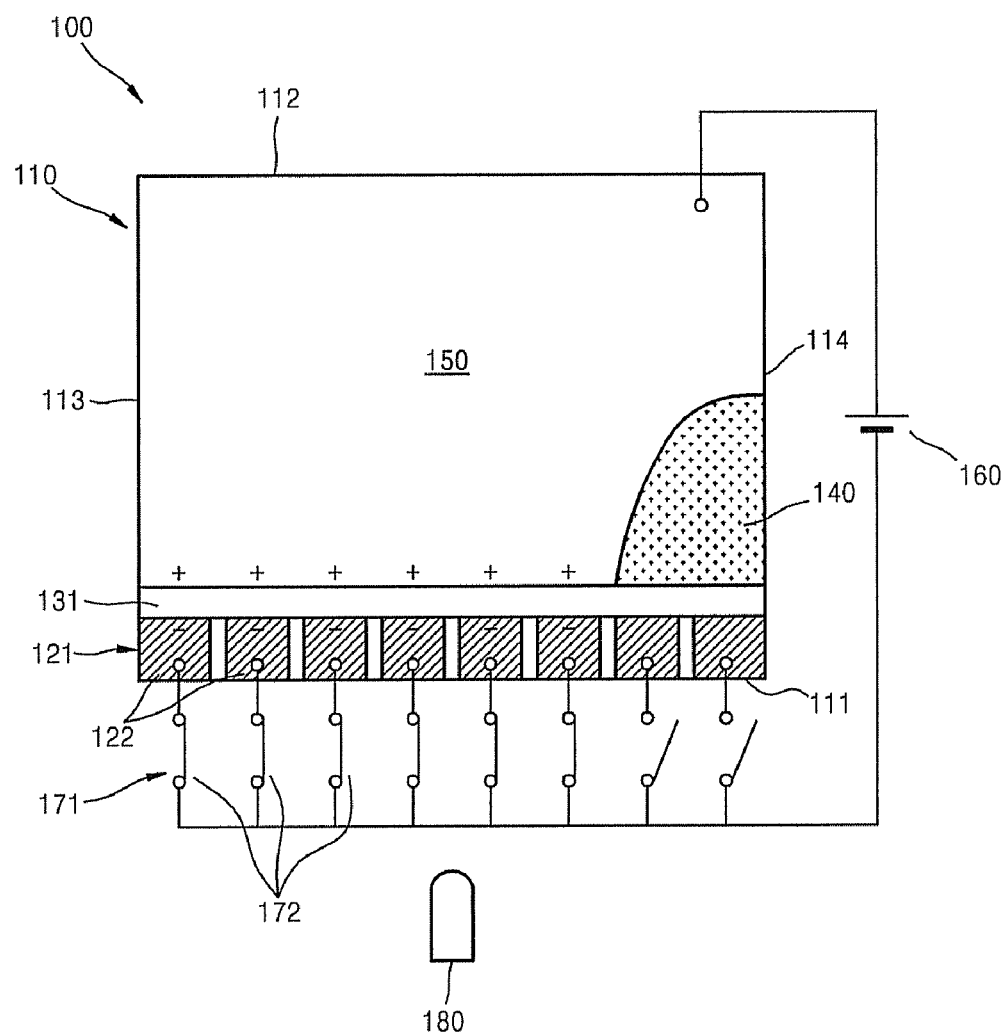

ELECTROWETTING OPTICAL DEVICE AND METHOD OF CONTROLLING VOLTAGE OF THE SAME

This application claims priority to Korean Patent Application No. 10-2006-0087516, filed on Sep. 11, 2006, and all the benefits accruing therefrom under 35 U.S.C. §119, the contents of which in its entirety are herein incorporated by reference.

BACKGROUND OF THE INVENTION

1. Field of the Invention

The present invention relates to an electrowetting optical device and method of controlling voltage of the same, and more particularly, to an electrowetting optical device that selectively turns on pixels by moving liquid using an electrowetting effect and a method of controlling voltage of the same.

2. Description of the Related Art

Electrowetting is a type of electrocapillarity involving a contact angle change caused by an interfacial tension change arising by interfacial electric charge. In particular, the term electrowetting is used when a thin insulation layer is formed on an interface to increase the electric potential level of the interface.

Since an electric field is used in a method of controlling a tiny amount of liquid or fine particles contained in liquid using the electrowetting effect, wiring lines and electrodes formed integrally with a biochip or microfluidic device can be used in the controlling method. Further, in the controlling method, a tiny amount of liquid can be moved at a high speed of about 1 cm/s, and the movement of liquid can be controlled using a low voltage (assuming less electricity). For these advantages, the controlling method using the electrowetting effect may be used in conjunction with micromachining for the next generation of display devices.

FIG. 1 is a schematic view illustrating a conventional electrowetting optical device 10 of the prior art, and FIGS. 2A through 2C are cross-sectional views illustrating the movement of an oil layer when a voltage is supplied to the conventional electrowetting optical device 10 of the prior art.

Referring to FIG. 1, the electrowetting optical device 10 includes a cell 11 that is surrounded by a light-incident surface 11a, a light-exit surface 11b formed opposite to the light-incident surface 11a, and side surfaces 11c and 11d, an electrode 12 formed on the light-incident surface 11a, an insulation layer 13 formed on the electrode 12, an oil layer 14 filled in the cell 11 to a predetermined thickness and contacting the insulation layer 13, an aqueous solution layer 15 filled in the cell 11 and contacting the oil layer 14, a power source 16 electrically connecting the aqueous solution layer 15 and the insulation layer 13, a switch 17 turning on and off the power source 16 and a light source 18 disposed outside the cell 11 for emitting light onto the cell 11.

When the switch 17 is turned off as shown in FIG. 1, the oil layer 14 covers the top surface of the insulation layer 13 and the aqueous solution layer 15 is separated from the insulation layer 13 by the oil layer 14, since the insulation layer 13 is hydrophobic.

The oil layer 14 is a light-blocking layer, and the aqueous solution layer 15 is a light-transmitting layer, such that light emitted from the light source 18 cannot reach the aqueous solution layer 15 since the oil layer 14 blocks the light entering from the light incident surface 11a.

Referring to FIG. 2A, when the switch 17 is turned on, an electric potential is formed on the insulation layer 13, thereby changing the insulation layer 13 from hydrophobic to hydrophilic. Thus, the affinity between the insulation layer 13 and the oil layer 14 decreases, and instead the affinity between the insulation layer 13 and the aqueous solution layer 15 increases, thereby making the oil layer 14 unstable. For this reason, the oil layer 14 concentrates to departing from the unstable state, and the contact area between the insulation layer 13 and the oil layer 14 reduces to a minimal amount.

As a result, the aqueous solution layer 15 can make contact with the insulation layer 13, and light emitted from the light source 18 can pass through the aqueous solution layer 15 and the light-exit surface 11b. When the aqueous layer 15 has one of red, green, and blue colors, light passing through the aqueous layer 15 can have the same color as the aqueous solution layer 15. When each pixel of the electrowetting optical device is configured with three cells respectively having red, green, and blue aqueous solution layers, an image having various colors can be realized by selectively applying a voltage to the cells.

FIGS. 2A through 2C are cross-sectional views illustrating the movement of the oil layer 14 when a voltage is supplied to the electrode 12. FIG. 2A illustrates when the oil layer 14 is moved to the left side of the cell 11, FIG. 2B illustrates when the oil layer 14 is moved to the right side of the cell 11, and FIG. 2C illustrates when the oil layer 14 is moved to both left and right sides of the cell 11. That is, when a voltage is applied to the electrode 12, it is difficult to predict the moving direction of the oil layer 14. Moreover, when the oil layer 14 is moved to both sides of the cell 11, as shown in FIG. 2C, the amount of the oil layer 14 may be different on both sides of the cell 11.

BRIEF SUMMARY OF THE INVENTION

The present invention provides an exemplary embodiment of an electrowetting optical device in which the movement of an oil layer can be precisely controlled in a desired direction by a desired amount by applying a voltage sequentially to a plurality of electrodes, and an exemplary embodiment of a method of controlling a voltage of the exemplary electrowetting optical device.

According to exemplary embodiments of the present invention, an electrowetting optical device includes a cell surrounded by a light-incident surface, a light-exit surface, and a plurality of side surfaces, an electrode portion formed along the light-incident surface, the electrode portion including at least two electrodes, an insulation layer covering at least a portion of the electrode portion, an oil layer within the cell, the oil layer contacting the electrode portion, an aqueous solution layer filled in the cell, the aqueous solution layer contacting the oil layer, and a light source emitting light onto the light-incident surface.

According to other exemplary embodiments of the present invention, the electrowetting optical device further includes a power source connected to the aqueous solution layer and the electrode portion and applying a voltage to the electrode portion, a controller controlling the voltage applied to the electrode portion to apply the voltage to the electrodes of the electrode portion in a particular order, wherein the controller controls the voltage applied to the electrode portion to apply the voltage sequentially to the electrodes of the electrode portion from a first side to a second side of the electrode portion or from a central portion to opposite sides of the electrode portion, so as to move the oil layer toward one side or opposite sides of the cell to control an amount of an incident light passing through the cell.

According to still other exemplary embodiments of the present invention, a method of controlling a voltage of an electrowetting optical device includes supplying a voltage to a first electrode portion including at least two electrodes formed along a light-incident surface, and supplying a voltage to a second electrode portion including at least two electrodes formed along a first side surface of side surfaces extending from opposite sides of the light-incident surface, to move an oil layer contacting the first and second electrode portions in a particular direction, wherein the voltage supplied to the first electrode portion is supplied sequentially to the electrodes of the first electrode portion from a first side to a second side of the first electrode portion or from a central portion to the first and second sides of the first electrode portion, and the voltage supplied to the second electrode portion is supplied sequentially to the electrodes of the second electrode portion from a first side of the second electrode portion adjoining the first electrode portion to a second side of the second electrode portion, to shift the oil layer contacting the first electrode portion toward the second electrode portion.

According to yet other exemplary embodiments of the present invention, a method of controlling movement of a light-blocking oil layer in an electrowetting optical device, where the electrowetting optical device includes a cell surrounded by a light-incident surface, a light-exit surface, and a plurality of side surfaces, the method includes forming an electrode portion along the light-incident surface, the electrode portion including at least two electrodes, covering at least a portion of the electrode portion with an insulation layer, contacting the insulation layer with the oil layer, and sequentially applying voltage to the electrodes of the electrode portion from a first side to a second side of the electrode portion or from a central portion to the first and second sides of the electrode portion to selectively move the oil layer away from a section of the electrode portion and allow light to pass through the cell.

BRIEF DESCRIPTION OF THE DRAWINGS

The above and other features and advantages of the present invention will become more apparent by describing in detail exemplary embodiments thereof with reference to the attached drawings in which:

FIGS. 2A through 2C are cross-sectional views illustrating the movement of an oil layer when a voltage is supplied to the conventional electrowetting optical device of the prior art of FIG. 1;

FIGS. 4A through 4C are views illustrating the movement of an oil layer from one side of a cell to another side of the cell in the exemplary electrowetting optical device of FIG. 3 according to an exemplary embodiment of the present invention;

DETAILED DESCRIPTION OF THE INVENTION

Figure 1:
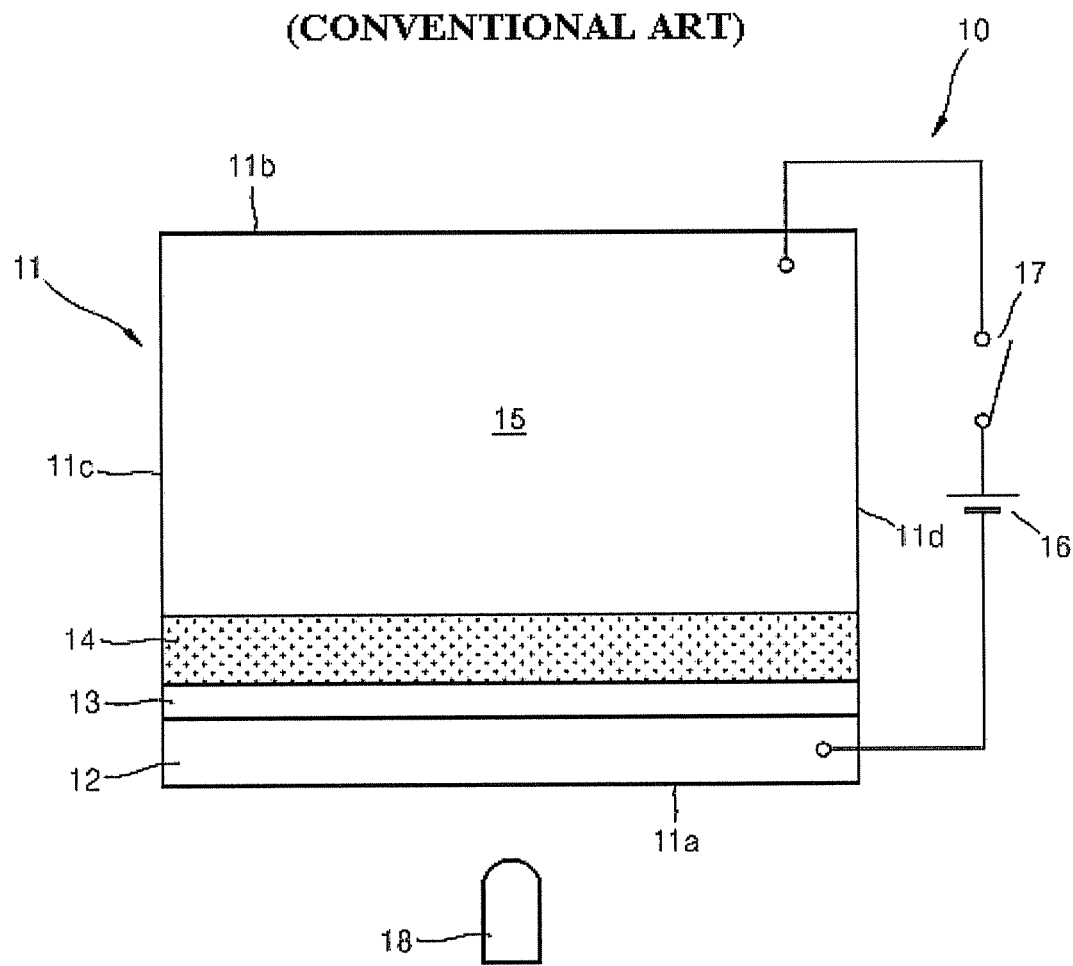
FIG. 1 is a schematic view illustrating a conventional electrowetting optical device of the prior art.
Figure 2B:
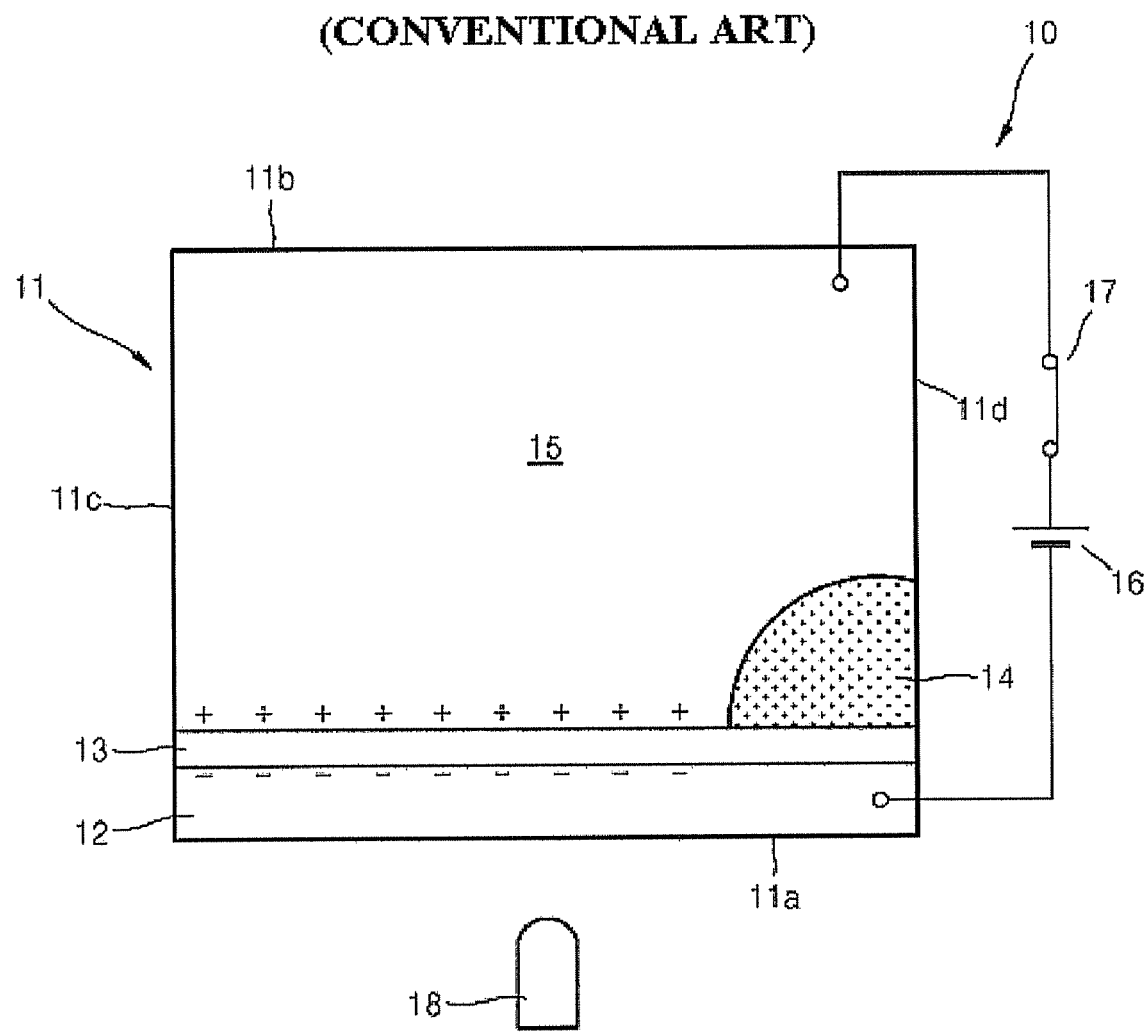
Figure 2C:
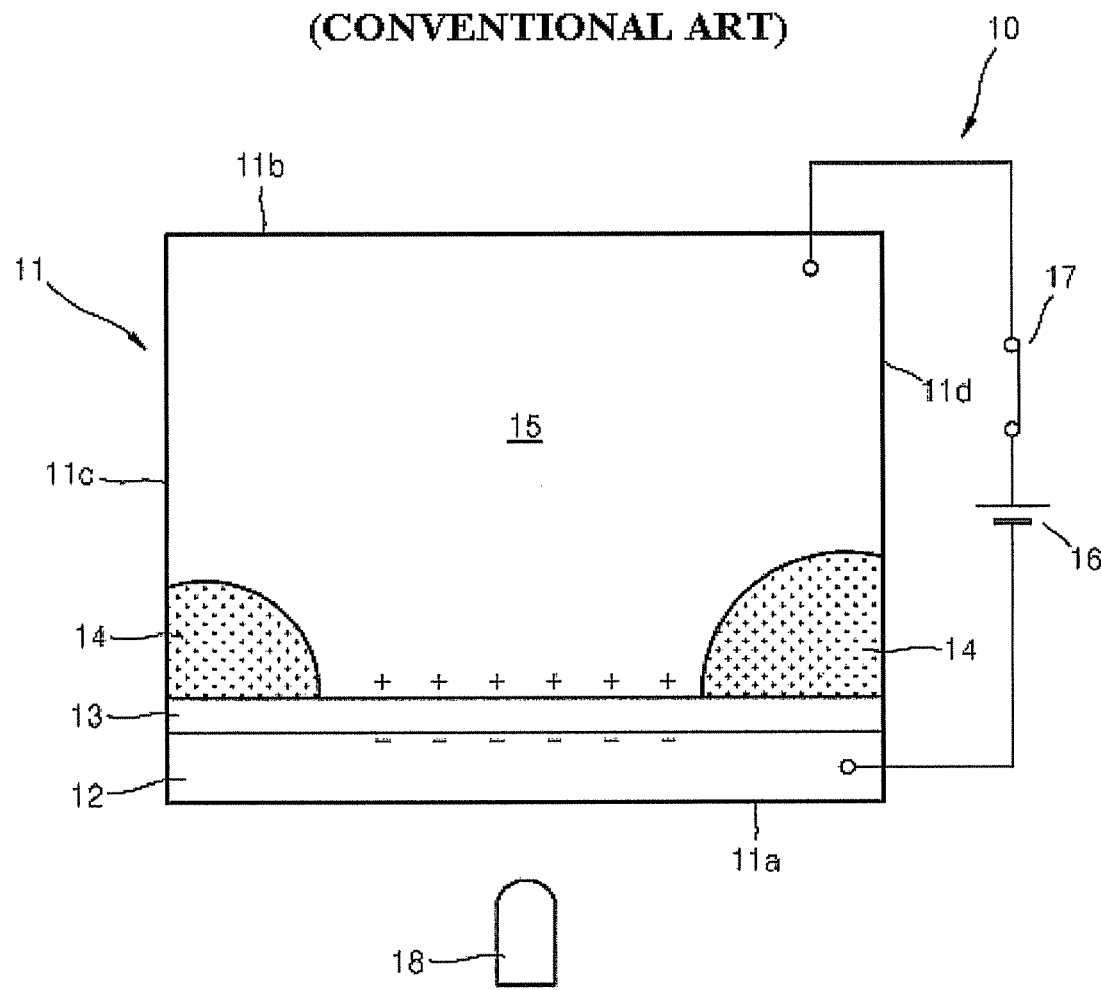

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 3:
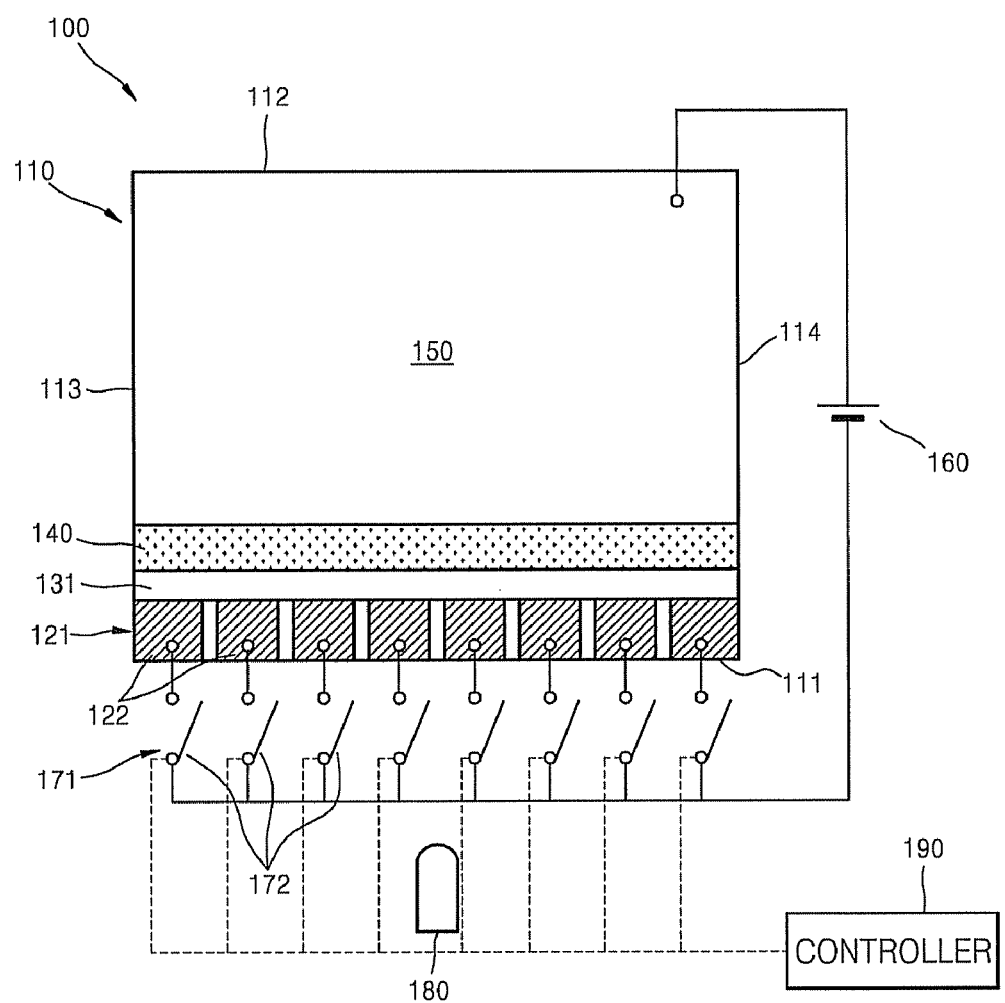
FIG. 3 is a view illustrating an exemplary electrowetting optical device according to an exemplary embodiment of the present invention.

FIG. 3 is a view illustrating an electrowetting optical device 100 according to an exemplary embodiment of the present invention. Referring to FIG. 3, the electrowetting optical device 100 includes a cell 110, a first electrode portion 121, a first insulation layer 131, an oil layer 140, an aqueous solution layer 150, a power source 160, a first switch portion 171, and a controller 190.

The cell 110 includes an incident surface 111, an exit surface 112 formed opposite to the incident surface 111 and left and right (first and second) opposite side surfaces 113 and 114, respectively, which are formed at both left and right sides of the incident surface 111 and the exit surface 112. Light enters into the cell 110 through the incident surface 111 and leaves the cell 110 through the exit surface 112. Although the illustrated cell 110 has a rectangular sectional shape, the sectional shape of the cell 110 is not limited to the shape illustrated in FIG. 3. In alternative exemplary embodiments, the cell 110 may include various sectional shapes.

The first electrode portion 121 is a characteristic element of the exemplary embodiments of the present invention. The first electrode portion 121 includes a plurality of electrodes 122 arranged at predetermined intervals along the incident surface 111. While the electrodes 122 are illustrated as evenly spaced and substantially equally sized, alternative arrangements of the electrodes 122 are within the scope of these embodiments. Each of the electrodes 122 is connected to the switch portion 171, such that the electrodes 122 can be individually turned on and off.

The first insulation layer 131 includes a hydrophobic property and is formed on a top surface of the first electrode portion 121. Various methods can be used to make the first insulation layer 131 hydrophobic. That is, the present invention is not limited to a specific method of making the first insulation layer 131 hydrophobic.

The oil layer 140 is filled in the cell 110 to a predetermined thickness for making contact with the first insulation layer 131. Since the first insulation layer 131 is hydrophobic, the oil layer 140 makes contact with the first insulation layer 131 when a voltage is not supplied to the first electrode portion 121. The oil layer 140 is a light-blocking layer, such that light cannot pass through the oil layer 140. Because the oil layer 140 completely covers the first insulation layer 131, from the left side surface 131 to the right side surface 114, light cannot pass from the incident surface 111 to the exit surface 112.

The aqueous solution layer 150 is filled in the cell 110 for making contact with the first insulation layer 131 when the oil layer 140 is moved as will be described below. The aqueous solution layer 150 is a light-transmitting layer, such that light can pass through the aqueous solution layer 150. The aqueous solution layer 150 can be red (R), green (G), or blue (B). In this case, light has the same color as the aqueous solution layer 150 after passing through the aqueous solution layer 150. When each pixel is configured with three cells respectively having red, green, and blue aqueous solution layers, an image having various colors can be realized or created by selectively applying a voltage to the cells 110.

The power source 160 is electrically connected between the aqueous solution layer 150 and the electrodes 122 of the first electrode portion 121 so as to apply a voltage across the cell 110.

A light source 180 is disposed outside the cell 110 for emitting light. Light emitted from the light source 180 may be irradiated into the cell 110 through the incident surface 111.

The controller 190 is connected to each switch 172 of the switch portion 171 to individually turn on or off each of the switches 172.

An operation of the electrowetting optical display 100 will now be described with reference to the accompanying drawings according to an exemplary embodiment of the present invention.

First, an exemplary method of moving the oil layer 140 from one side of the cell 110 to an opposite side of the cell 110 will now be described with reference to FIGS. 3 and 4A through 4C.

Referring to FIG. 3, when no voltage is supplied to the electrodes 122 of the first electrode portion 121, the first insulation layer 131 has an affinity for the oil layer 140 since the first insulation layer 131 is hydrophobic. Therefore, the first insulation layer 131 makes contact with the oil layer 140, and the aqueous solution layer 150 is separated from the first insulation layer 131 by the oil layer 140.

Light emitted from the light source 180 cannot pass through the cell 110 when the oil layer 140 covers the first insulation layer 131 since the oil layer 140 is a light-blocking layer.

Figure 4A:
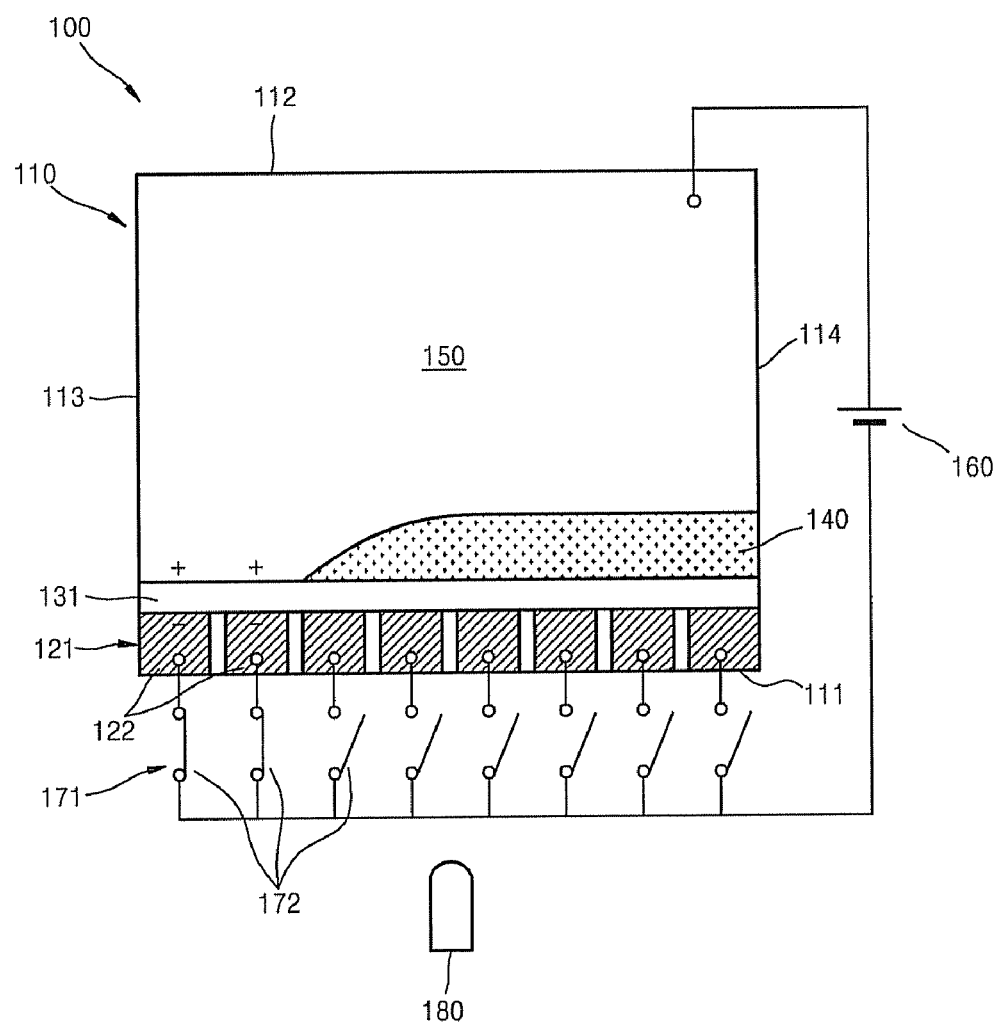
Figure 4B:
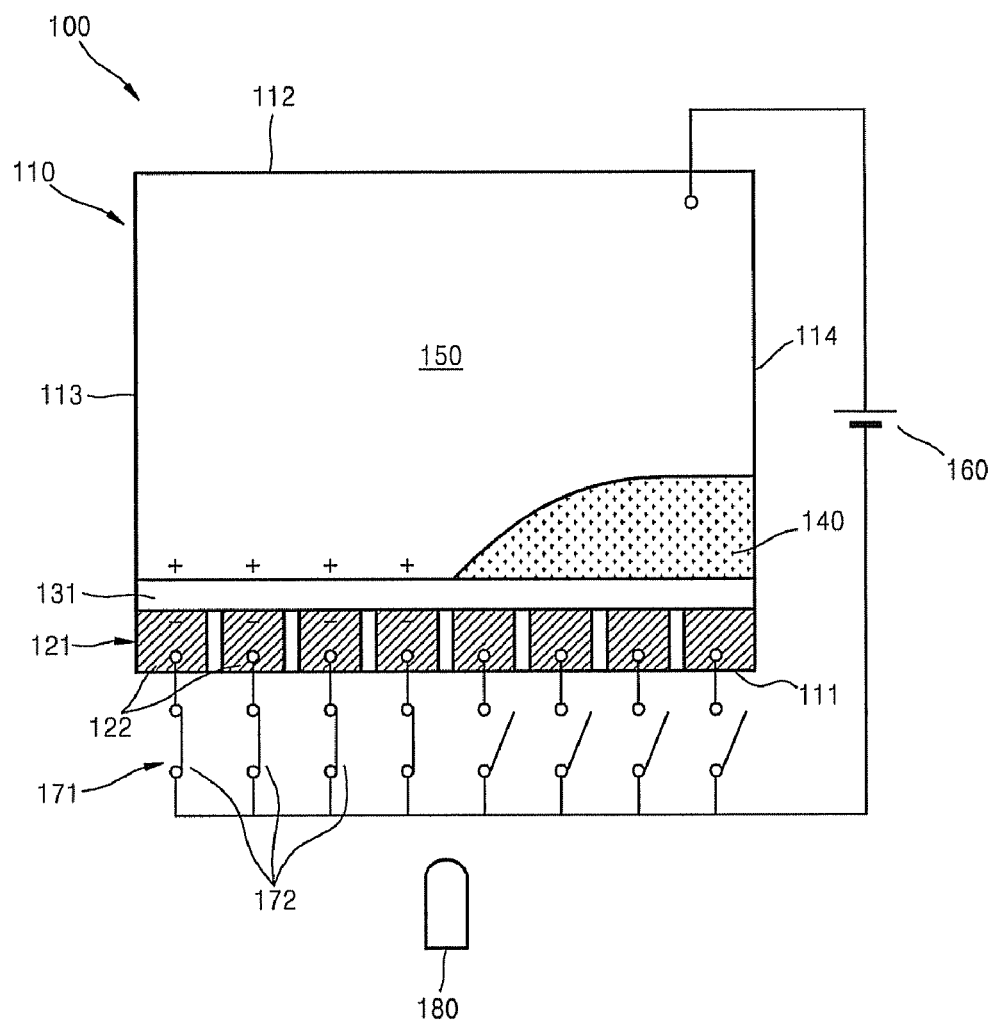

Referring to FIGS. 4A through 4C, a voltage is sequentially supplied to the electrodes 122 from the left side surface 113 of the cell 110 (from the leftmost electrode) toward the right side surface 113 of the cell 110, so as to move the oil layer 140 from the left side surface 113 toward the right side surface 114 of the cell 110. In other words, the oil layer 140 is moved from a first side of the cell 110 to a second opposite side of the cell 110.

A portion of the first insulation layer 131 facing the electrodes 122 to which a voltage is supplied is sequentially changed from hydrophobic to hydrophilic due to an electric potential formed by the electrodes 122. Therefore, the oil layer 140 moves toward a right side portion of the first insulation layer 131 where an electric potential is not formed, and the aqueous solution layer 150 makes contact with the portion of the first insulation layer 131 facing the electrodes 122 to which a voltage is applied.

Referring to FIG. 4C, the oil layer 140 is moved to a region adjacent to the right side surface 114 of the cell 110. In this state, light emitted from the light source 180 can pass through the first insulation layer 131 where the oil layer 140 is not present and through the aqueous solution layer 150 contacting the insulation layer 131. Then, the light can exit from the cell 110 through the exit surface 112.

Next, an exemplary method of moving the oil layer 140 from a central portion of the cell 110 toward opposing sides of the cell 110 will now be described with reference to FIGS. 5A and 5B.

Figure 5A:
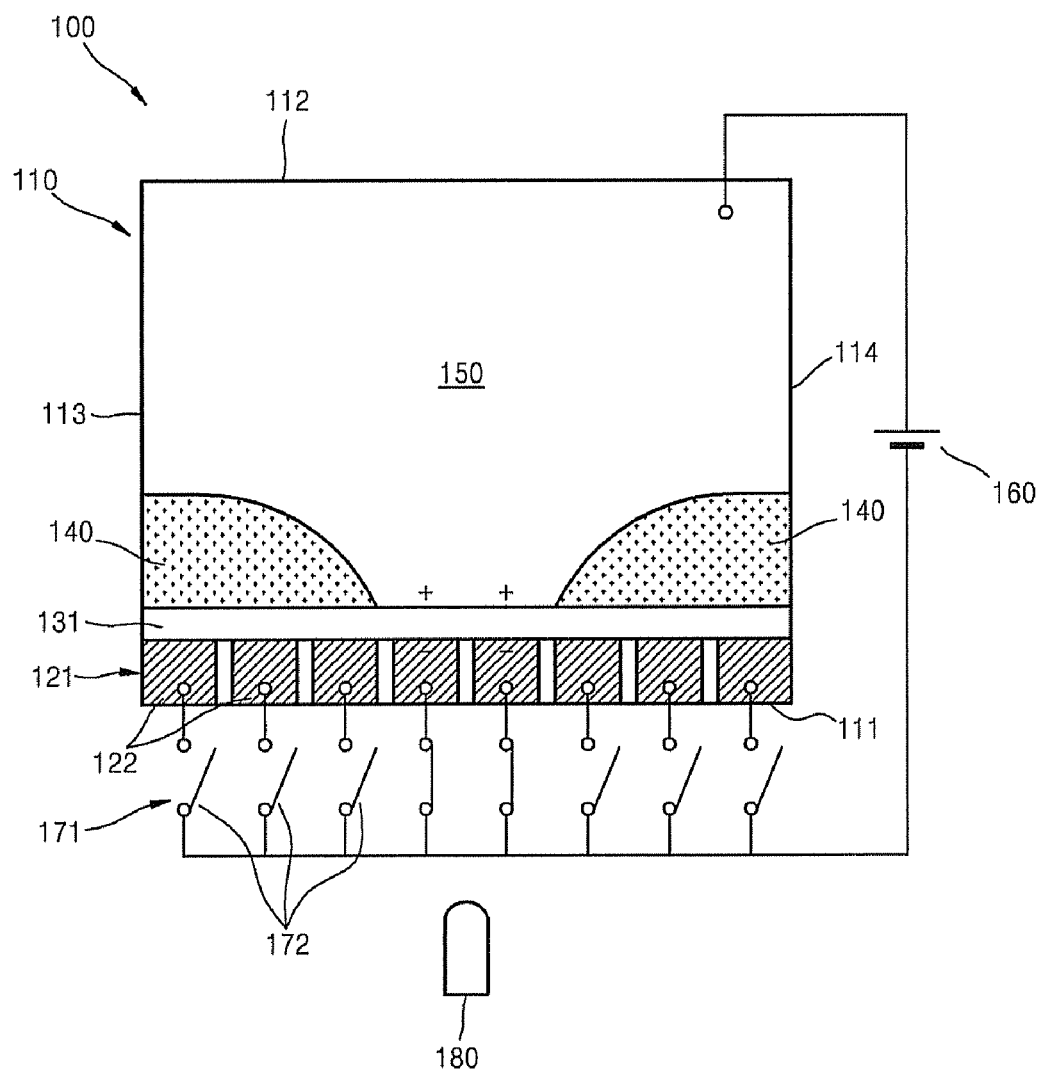
FIGS. 5A and 5B are views illustrating the movement of an oil layer from a central portion to opposing sides of the cell in the exemplary electrowetting optical device of FIG. 3 according to an exemplary embodiment of the present invention.
Figure 5B:
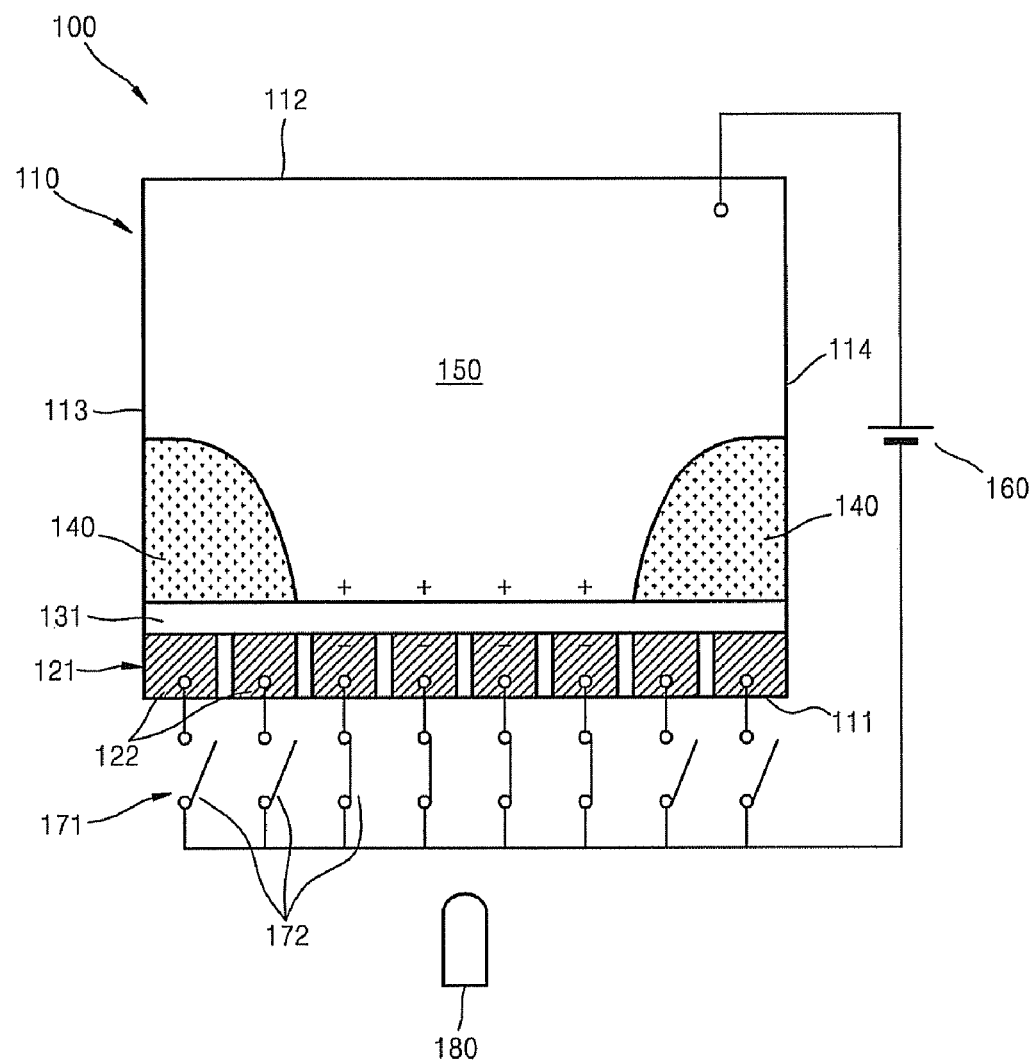

Referring to FIGS. 5A and 5B, a voltage is sequentially supplied to the electrodes 122 from a central electrode or electrodes 122 toward the leftmost and rightmost electrodes 122 so as to move the oil layer 140 from a central portion of the first insulation layer 131 toward both the left side surface 113 and the right side surface 114 of the cell 110.

A portion of the first insulation layer 131 facing the electrodes 122 to which a voltage is supplied is sequentially changed from hydrophobic to hydrophilic due to an electric potential formed by the electrodes 122. Therefore, the oil layer 140 moves toward lateral portions of the first insulation layer 131 where an electric potential is not formed, and the aqueous solution layer 150 makes contact with a central portion of the first insulation layer 131 facing the central electrodes 122 to which a voltage is supplied, as illustrated in FIG. 5A.

Referring to FIG. 5B, the oil layer 140 is separated toward the left side surface 113 and toward the right side surface 114 of the cell 110. In this state, light emitted from the light source 180 can pass through a central region of the first insulation layer 131 and the aqueous solution layer 150 contacting the first insulation layer 131. Then, the light can exit from the cell 110 through the exit surface 112.

Therefore, the oil layer 140 can be moved in a desired direction by a desired amount by sequentially applying a voltage to the electrodes 122 starting from a certain electrode, such that the oil layer 140 can be precisely controlled. While exemplary patterns of voltage application to the electrodes 122 have been described, other patterns would also be within the scope of these embodiments. For example, the voltage may be applied to the rightmost electrode 122 first, and then sequentially applied to adjacent electrodes 122 such that the oil layer 140 is pushed against the left side surface 113, opposite that which is shown in FIG. 4C. Also, the voltage may be applied to the some electrodes 122 simultaneously, while applied to other electrodes 122 singularly.

Figure 6:
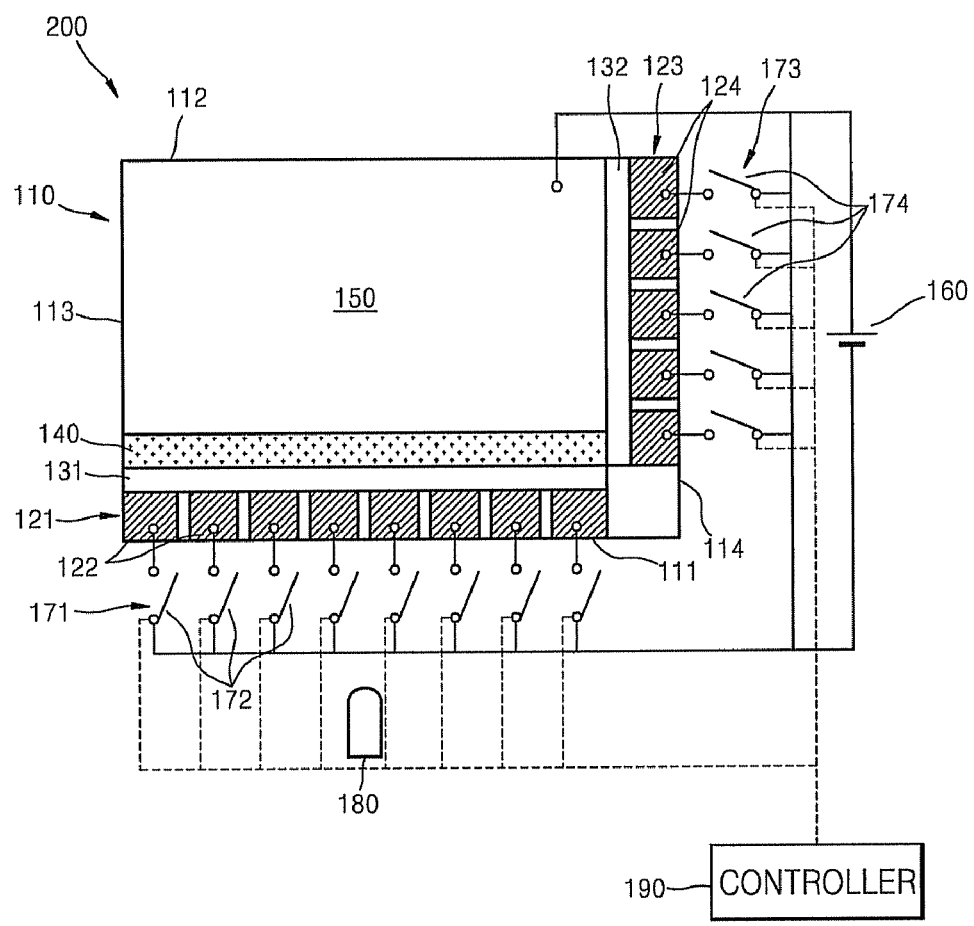
FIG. 6 is a view illustrating an exemplary electrowetting optical device according to another exemplary embodiment of the present invention.
Figure 7A:
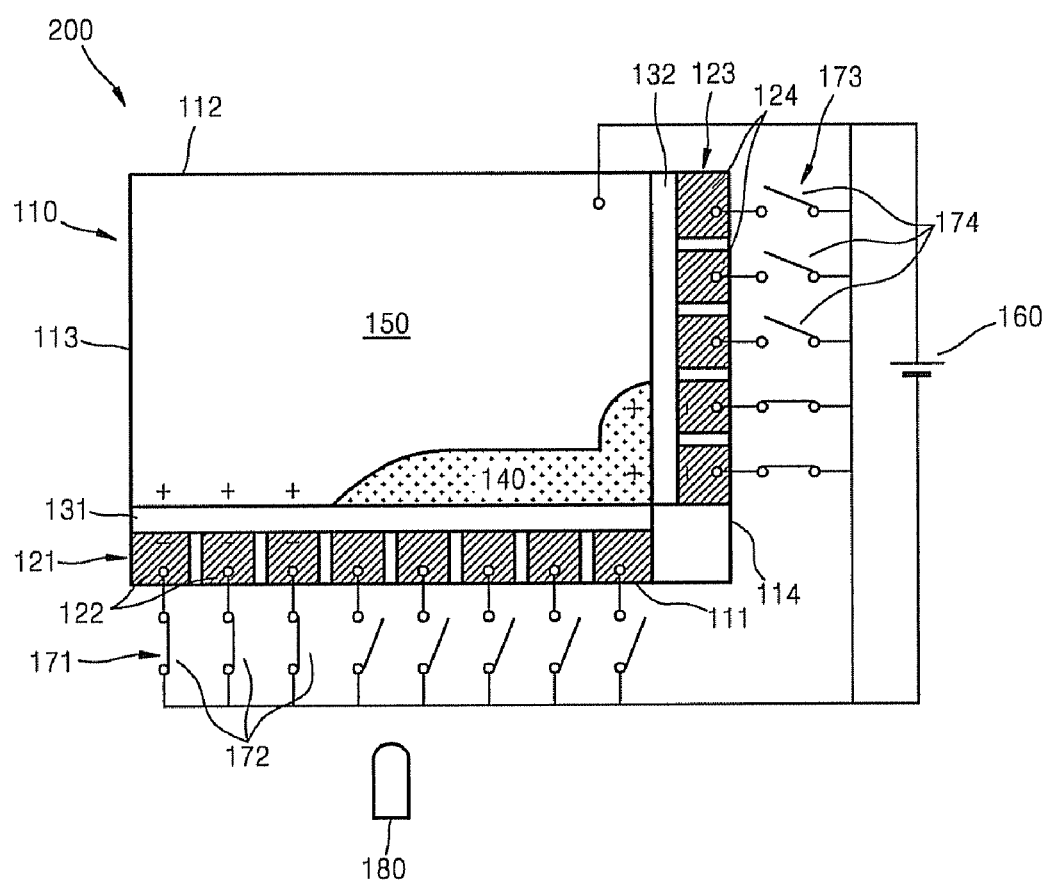
FIGS. 7A and 7B are views illustrating the movement of an oil layer from one side of the cell to another side of the cell in the exemplary electrowetting optical device of FIG. 6 according to an exemplary embodiment of the present invention.
Figure 7B:
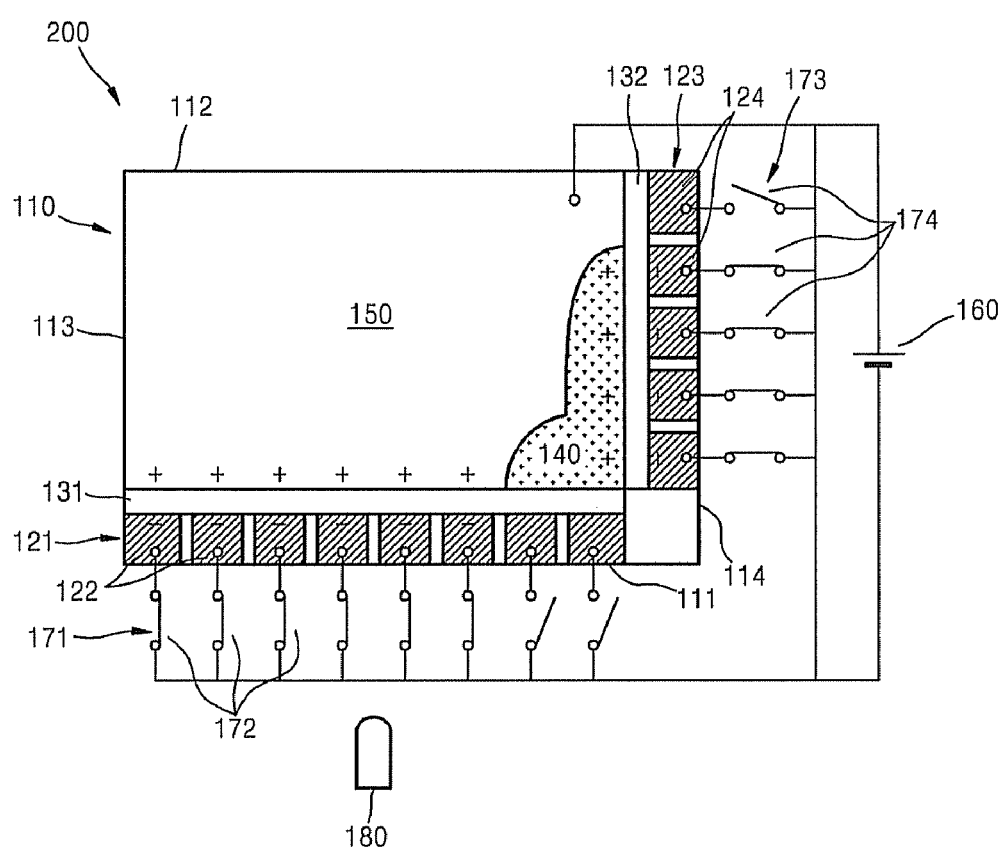
Figure 8A:
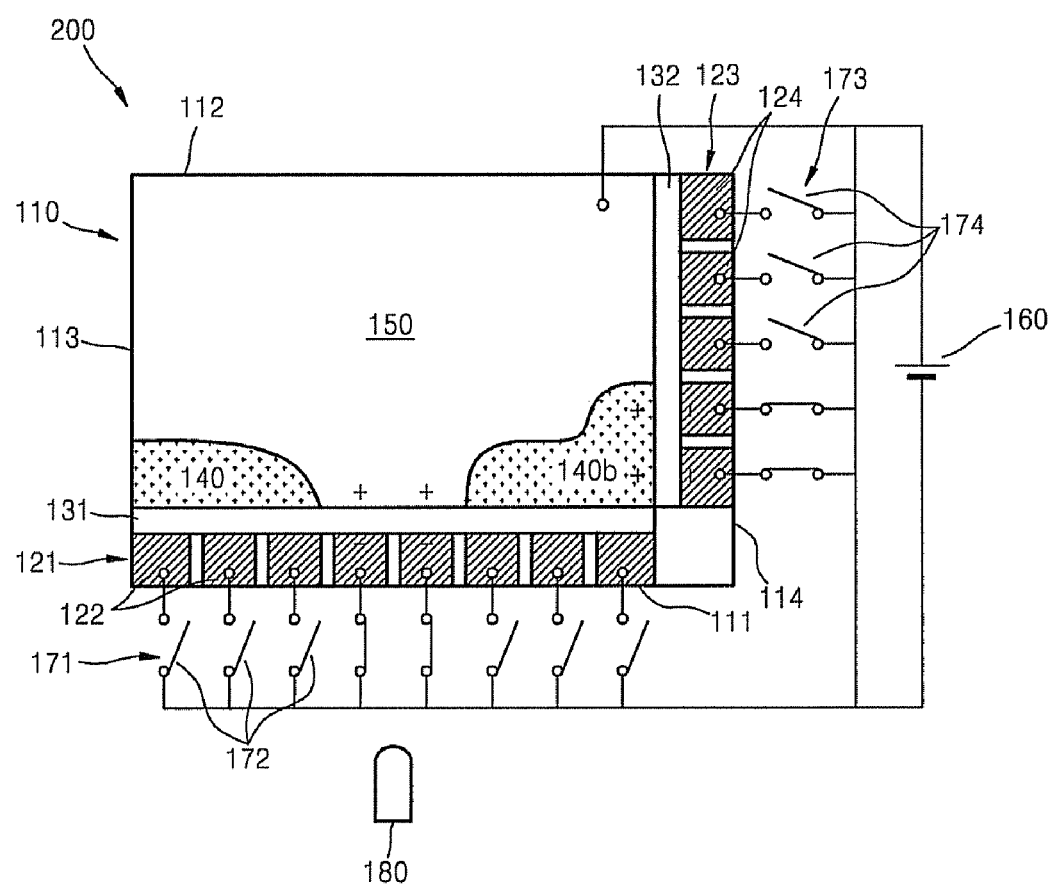
FIGS. 8A and 8B are views illustrating the movement of an oil layer from a central portion to opposing sides of the cell in the exemplary electrowetting optical device of FIG. 6 according to an exemplary embodiment of the present invention.
Figure 8B:
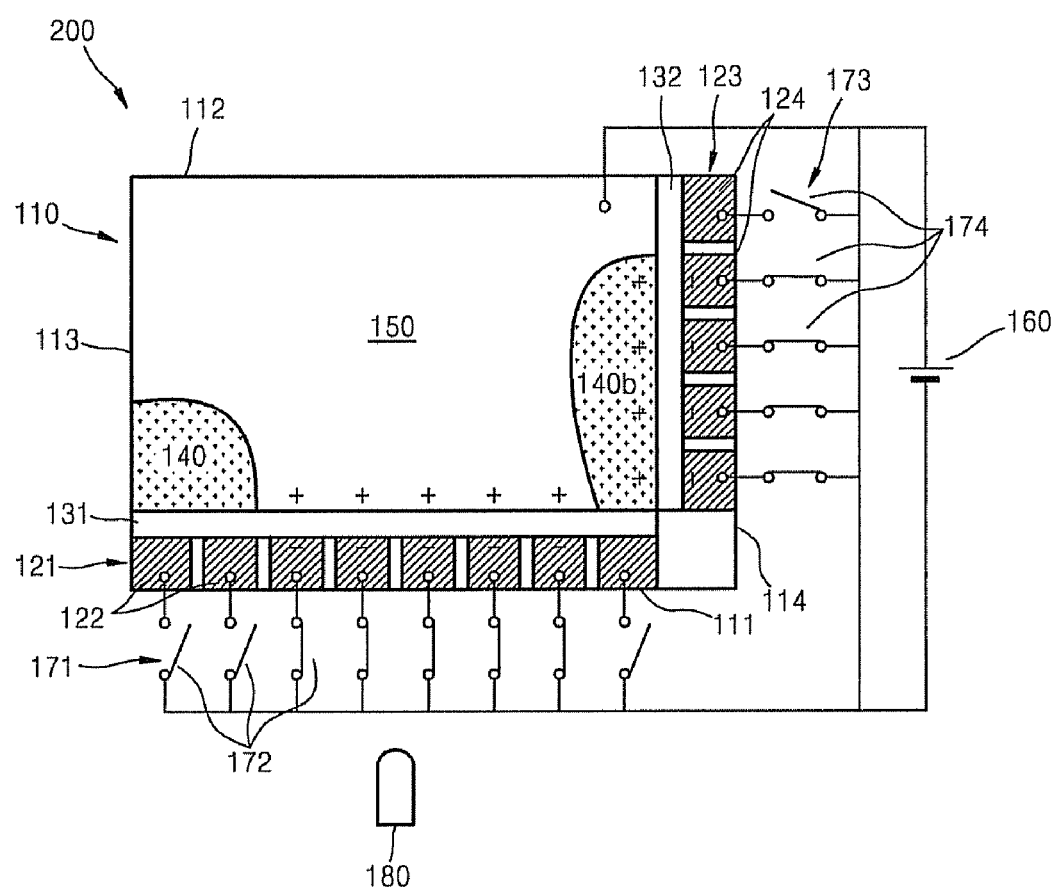

FIG. 6 is a view illustrating an electrowetting optical device 200 according to another exemplary embodiment of the present invention, FIGS. 7A and 7B are views illustrating the movement of an oil layer 140 from one side of a cell 110 to another side of the cell 110 in the electrowetting optical device 200 according to an exemplary embodiment of the present invention, and FIGS. 8A and 8B are views illustrating the movement of the oil layer 140 from a central portion of the cell 110 to opposing sides of the cell 110 in the electrowetting optical device 200 according to an exemplary embodiment of the present invention.

In the exemplary embodiments of FIGS. 6 through 8B, the electrowetting optical device 200 further includes a second electrode portion 123 located on a side of the cell 110 as compared with the exemplary embodiments of FIGS. 3 through 4C. Thus, the oil layer 140 can be moved more rapidly and precisely using the first and second electrode portions 121 and 123, respectively. The second electrode portion 123 is used as a driving unit for moving the oil layer 140.

Referring to FIG. 6, the electrowetting optical device 200 includes the cell 110, the first electrode portion 121, the oil layer 140, the aqueous solution layer 150, the power source 160, the light source 180, the first switch portion 171, the controller 190, the second electrode portion 123, a second insulation layer 132, and a second switch portion 173.

The first electrode portion 121, the first insulation layer 131, the oil layer 140, the aqueous solution layer 150, the light source 180, the first switch portion 171, and the controller 190 include substantially the same structures as in the exemplary embodiment of FIG. 3. Thus, detailed descriptions of these elements will be omitted.

The second electrode portion 123 includes a plurality of electrodes 124 arranged along the right side surface 114 of the cell 110 at predetermined intervals. Alternatively, the second electrode portion 123 may be arranged along the left side surface 113 of the cell 110. The second switch portion 173 is electrically connected to each of the electrodes 124 so as to selectively apply a voltage to the electrodes 124. Further, the electrodes 124 of the second electrode portion 123 are electrically connected to the power source 160.

The second insulation layer 132 includes hydrophilic characteristics and is formed on an inner surface of the second electrode portion 123 adjacent the aqueous solution layer 150. When no voltage is applied to the second electrode portion 123, the second insulation layer 132 has an affinity for the aqueous solution layer 150 since the second insulation layer 132 is hydrophilic. Thus, the second insulation layer 132 makes contact with the aqueous solution layer 150. Various methods can be used to make the second insulation layer 132 hydrophilic. That is, the present invention is not limited to a specific method of making the second insulation layer 132 hydrophilic.

An operation of the electrowetting optical display 200 will now be described with reference to the accompanying drawings according to an exemplary embodiment of the present invention.

First, an exemplary method of moving the oil layer 140 from one side of the cell 110 to an opposite side of the cell 110 will now be described with reference to FIGS. 6, 7A, and 7B.

Referring to FIG. 6, when no voltage is supplied to the electrodes 122 and 124 of the first and second electrode portions 121 and 123, respectively, the first insulation layer 131 has an affinity for the oil layer 140 since the first insulation layer 131 is hydrophobic. Therefore, the first insulation layer 131 makes contact with the oil layer 140. Meanwhile, the second insulation layer 132 has an affinity for the aqueous solution layer 150 since the second insulation layer 132 is hydrophilic. Therefore, the second insulation layer 312 makes contact with the aqueous solution layer 150.

The aqueous solution layer 150 and the first insulation layer 131 are separated from each other by the oil layer 140. Light emitted from the light source 180 cannot pass through the cell 110 when the oil layer 140 covers the first insulation layer 131 since the oil layer 140 is a light-blocking layer.

Referring to FIGS. 7A and 7B, a voltage is sequentially supplied to the electrodes 122 of the first electrode portion 121 from the left side surface 113 of the cell 110 (from the leftmost electrode) so as to move the oil layer 140 from the left side surface 113 toward the right side surface 114 of the cell 110. In other words, the oil layer 140 is moved from the first side surface of the cell 110 to the second opposite side surface of the cell 110.

A portion of the first insulation layer 131 facing the electrodes 122 to which a voltage is supplied is sequentially changed from hydrophobic to hydrophilic due to an electric potential formed by the electrodes 122. Therefore, the oil layer 140 moves toward a right side portion of the first insulation layer 131 where an electric potential is not formed, and the aqueous solution layer 150 makes contact with the portion of the first insulation layer 131 facing the electrodes 122 to which a voltage is applied.

At this time, a voltage is sequentially supplied to the electrodes 124 of the second electrode portion 123 formed on the right side surface 114 of the cell 110, starting from an electrode 124 most closely adjacent to the first electrode portion 121. Then, a portion of the second insulation layer 132 facing the electrodes 124 to which a voltage is supplied is sequentially changed from hydrophilic to hydrophobic due to an electric potential formed by the electrodes 124. Therefore, the oil layer 140 moves upward along the portion of the second insulation layer 132 where an electric potential is formed, as illustrated in FIG. 7A. That is, the oil layer 140 pushed to the right side of the cell 110 by the first electrode portion 121 is then moved upward along the second insulation layer 132 by the second electrode portion 123.

Referring to FIG. 7B, the oil layer 140 is moved toward the right side surface 114 of the cell 110 by a voltage selectively applied to the first electrode portion 121 and is then moved up along the second insulation layer 132 by a voltage selectively applied to the second electrode portion 123. Therefore, light emitted from the light source 180 can pass through the first insulation layer 131 not covered by the oil layer 140 and through the aqueous solution layer 150 contacting the first insulation layer 131. Then, the light can exit from the cell 110 through the exit surface 112.

Next, an exemplary method of moving the oil layer 140 from a central portion of the cell 110 toward opposite sides of the cell 110 will now be described with reference to FIGS. 8A and 8B.

Referring to FIGS. 8A and 8B, a voltage is sequentially supplied to the electrodes 122 from the central most electrode or electrodes 122 toward the leftmost and rightmost electrodes 122 so as to move the oil layer 140 from a central portion of the cell 110 toward the left side surface 113 and the right side surface 114 of the cell 110. Then, a central portion of the first insulation layer 131 facing the electrodes 122 to which a voltage is supplied is sequentially changed from hydrophobic to hydrophilic due to an electric potential formed by the electrodes 122. Therefore, the oil layer 140 moves toward lateral portions of the first insulation layer 131 where an electric potential is not formed, and the aqueous solution layer 150 makes contact with the central portion of the first insulation layer 131 facing the electrodes 122 to which a voltage is supplied.

At this time, a voltage is sequentially supplied to the electrodes 124 of the second electrode portion 123 formed on the right side surface 114 of the cell 110, starting from an electrode 124 most closely adjacent to the first electrode portion 121. Then, a portion of the second insulation layer 132 facing the electrodes 124 to which a voltage is supplied is sequentially changed from hydrophilic to hydrophobic due to an electric potential formed by the electrodes 124. Therefore, the oil layer 140, which is not already pushed toward the left side surface 113, moves upward along the portion of the second insulation layer 132 where an electric potential is formed. That is, the portion of the oil layer 140 pushed to the right side of the cell 110 by the first electrode portion 121 is then moved upward along the second insulation layer 132 by the second electrode portion 123.

Referring to FIG. 8B, the oil layer 140 is separated toward the left side surface 113 and toward the right side surface 114 of the cell 110. A portion 140b of the oil layer 140 moved toward the right side surface 114 of the cell 110 is then further moved upward along the second insulation layer 132 by the second electrode portion 123. Therefore, a greater amount of light emitted from the light source 180 can pass through the first insulation layer 131 and the aqueous solution layer 150 contacting the first insulation layer 131. Then, the light can exit from the cell 110 through the exit surface 112.

Meanwhile, the oil layer 140 can be moved to its original position by switching off the voltage applied to the electrodes 122 and 124 of the first and second electrode portions 121 and 123, respectively, in a reverse order, as compared to the description in FIGS. 7A, 7B, 8A, and 8B. That is, when the electrodes 122 and 124 are sequentially switched off, the oil layer 140 can return its original position by its own characteristics and a repulsive force exerted by the second insulation layer 132 (which is hydrophilic when a voltage is not applied).

Therefore, the oil layer 140 can be moved more rapidly and precisely by adding the second electrode portion 123 and the second insulation layer 132, and changing the second insulation layer 132 between hydrophobic and hydrophilic in order to attract and repel the oil layer 140.

In FIGS. 7A, 7B, 8A, and 8B, the second electrode portion 123 is formed on the right side surface 114 of the cell 110. However, the present invention is not limited to the illustrated structure. In alternative exemplary embodiments, the second electrode portion 123 may be formed on the left side surface 113 or formed on both the left and right side surfaces 113 and 114 of the cell 110.

As described above, according to the present invention, the exemplary electrowetting optical device includes at least the following advantages.

Since the electrowetting optical device includes the electrode portion having a plurality of electrodes, the oil layer can be precisely moved in a desired direction or directions by sequentially applying a voltage to the electrodes.

Furthermore, the electrowetting optical device can include a plurality of electrode portions each having a plurality of electrodes. In this case, the oil layer can be moved more rapidly by sequentially applying a voltage to the electrodes of both the electrode portions. Thus, the operating speed of the electrowetting optical device can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrowetting optical device comprising:
    a cell surrounded by a light-incident surface, a light-exit surface, and a plurality of side surfaces;
    a first electrode portion formed along the light-incident surface and including at least two electrodes;
    a first insulation layer covering the first electrode portion;
    an oil layer filled in the cell to a predetermined thickness and contacting the first electrode portion;
    an aqueous solution layer filled in the cell and contacting the oil layer;
    a light source emitting light onto the light-incident surface;
    a second electrode portion formed along a first side surface of the plurality of side surfaces, the second electrode portion including at least two electrodes; and
    a second insulation layer covering at least a portion of the second electrode portion, the second insulation layer contacting the aqueous solution layer.

2. The electrowetting optical device of claim 1, wherein the electrodes of the first electrode portion are arranged along the light-incident surface at predetermined intervals.

3. The electrowetting optical device of claim 1, wherein the first insulation layer is hydrophobic.

4. The electrowetting optical device of claim 1, wherein the aqueous solution layer is a light-transmitting layer, and the oil layer is a light-blocking layer.

5. The electrowetting optical device of claim 4, wherein the aqueous solution layer is transparent or is formed of a aqueous solution having one of red, green, and blue colors.

6. The electrowetting optical device of claim 1, wherein the electrodes of the second electrode portion are arranged along the first side surface at predetermined intervals.

7. The electrowetting optical device of claim 1, wherein the second insulation layer is hydrophilic.

8. An electrowetting optical device comprising:
   a cell surrounded by a light-incident surface, a light-exit surface, and a plurality of side surfaces;
   a first electrode portion formed along the light-incident surface and including at least two electrodes;
   a first insulation layer covering the first electrode portion;
   an oil layer filled in the cell to a predetermined thickness and contacting the first electrode portion;
   an aqueous solution layer filled in the cell and contacting the oil layer;
   a power source connected to the aqueous solution layer and the first electrode portion and applying a voltage to the first electrode portion;
   a controller controlling the voltage applied to the first electrode portion so as to apply the voltage to the electrodes of the first electrode portion in a predetermined order;
   a light source emitting light onto the light-incident surface;
   a second electrode portion formed along a first side surface of the plurality of side surfaces and including at least two electrodes; and
   a second insulation layer covering at least a portion of the second electrode portion, the second insulation layer contacting the aqueous solution layer,
   wherein the controller controls the voltage applied to the electrode portion to apply the voltage sequentially to the electrodes of the electrode portion from one side to the other side of the electrode portion or from a center portion to both sides of the electrode portion, so as to move the oil layer toward one side or both sides of the cell for controlling the amount of the incident light passing through the cell.

9. The electrowetting optical device of claim 8, wherein the electrodes of the first electrode portion are arranged along the light-incident surface at predetermined intervals.

10. The electrowetting optical device of claim 8, wherein the first insulation layer is hydrophobic.

11. The electrowetting optical device of claim 8, wherein the aqueous solution layer is a light-transmitting layer, and the oil layer is a light-blocking layer.

12. The electrowetting optical device of claim 11, wherein the aqueous solution layer is transparent or is formed of a aqueous solution having one of red, green, and blue colors.

13. The electrowetting optical device of claim 8, wherein the electrodes of the second electrode portion are arranged along the side surface at predetermined intervals.

14. The electrowetting optical device of claim 8, wherein the second insulation layer is hydrophilic.

15. The electrowetting optical device of claim 8, wherein the second electrode portion is connected to the power source.

16. A method of controlling a voltage of an electrowetting optical device, the method comprising:
   supplying a voltage to a first electrode portion including at least two electrodes formed along a light-incident surface; and
   supplying a voltage to a second electrode portion including at least two electrodes formed along a first side surface of side surfaces extending from opposite sides of the light-incident surface, to move an oil layer contacting the first and second electrode portions in a particular direction,
   wherein the voltage supplied to the first electrode portion is supplied sequentially to the electrodes of the first electrode portion from a first side to a second side of the first electrode portion or from a central portion to first and second sides of the first electrode portion, and the voltage supplied to the second electrode portion is supplied sequentially to the electrodes of the second electrode portion from a first side of the second electrode portion adjoining the first electrode portion to a second side of the second electrode portion, to shift the oil layer contacting the first electrode portion toward the second electrode portion, and
   wherein a first insulation layer covers at least a portion of the first electrode portion and a second insulation layer covers at least a portion of the second electrode portion.

17. The method of claim 16, further comprising:
   sequentially switching off the electrodes of the first electrode portion from the second side to the first side of the first electrode portion or from the first and second sides to the central portion of the first electrode portion; and
   sequentially switching off the electrodes of the second electrode portion from the second side to the first side of the second electrode portion when sequentially switching off the electrodes of the first electrode portion, to shift the oil layer contacting the second electrode portion toward the first electrode portion.

18. A method of controlling movement of a light-blocking oil layer in an electrowetting optical device, the electrowetting optical device including a cell surrounded by a light-incident surface, a light-exit surface, and a plurality of side surfaces, the method comprising:
   forming a first electrode portion along the light-incident surface, the first electrode portion including at least two electrodes;
   forming a second electrode portion along a first side surface of the plurality of side surfaces;
   covering at least a portion of the first electrode portion with a first insulation layer;
   covering at least a portion of the second electrode portion with a second insulation layer;
   contacting the first insulation layer with the oil layer; and
   sequentially applying a voltage to the electrodes of the first electrode portion from a first side to a second side of the first electrode portion or from a central portion to the first and second sides of the first electrode portion to selectively move the oil layer away from a section of the first electrode portion and allow light to pass through the cell.

* * * * *